MARCUS A. McCOY
*INVENTOR.*
BY Bruce L. Birchard
HIS ATTORNEY

Feb. 11, 1958 M. A. McCOY 2,823,303

COMPRESSOR CIRCUITS FOR PANORAMIC RECEIVERS

Filed Oct. 29, 1953 2 Sheets-Sheet 2

MARCUS A. McCOY
*INVENTOR.*

BY Bruce L. Birchard

HIS ATTORNEY 2,823,303
Patented Feb. 11, 1958

2,823,303

COMPRESSOR CIRCUITS FOR PANORAMIC RECEIVERS

Marcus A. McCoy, Los Angeles, Calif., assignor to Hoffman Electronics Corporation, a corporation of California Application October 29, 1953, Serial No. 389,052

3 Claims. (Cl. 250—20)

This invention is related to electrical amplifying apparatus and more particularly to apparatus for compressing signals to a predetermined range of levels with a minimum loss in wave shape details and other characteristics of such signals.

In the past it has been the practice, when desiring to compare two signals of widely different amplitude, to rely upon current saturation limiters, non-linear-amplifiers, and the like. In connection with the use of such devices there is often a loss in the amplitude detail of the signals receiving a large degree of limiting. Such a loss of detail as to the nature of the signal makes it difficult or impossible to analyse its characteristics, and frequently prevents the separate detection of closely spaced signals.

It is an object, therefore, to provide an improved signal compressing circuit in which signals of widely differing amplitudes are reduced to relatively identical amplitudes with a minimum loss in the detail of any of the signals involved.

It is a further object to provide such a compressor circuit which has a high degree of stability and reliability.

It is a still further object of this invention to provide an improved signal receiver of the panoramic type in which the characteristics of multiple signals of varying amplitudes lying within the range of the receiver may be determined more accurately.

According to this invention there is provided in the intermediate frequency amplifier a cascade of vacuum tubes connected as grid-leak detectors, the gain of the stages and other characteristics of the stages being chosen so that as later stages in the cascaded compressor tend to reach plate-current cut-off by reason of the high level of drive from the preceding stage, the amount of drive from that preceding stage falls off, distortion is prevented with an attendant retention of fidelity of reproduction of the signal by the receiver. The circuit further assures fidelity by having a large amount of inverse feedback of the detected signals.

Figure 1:
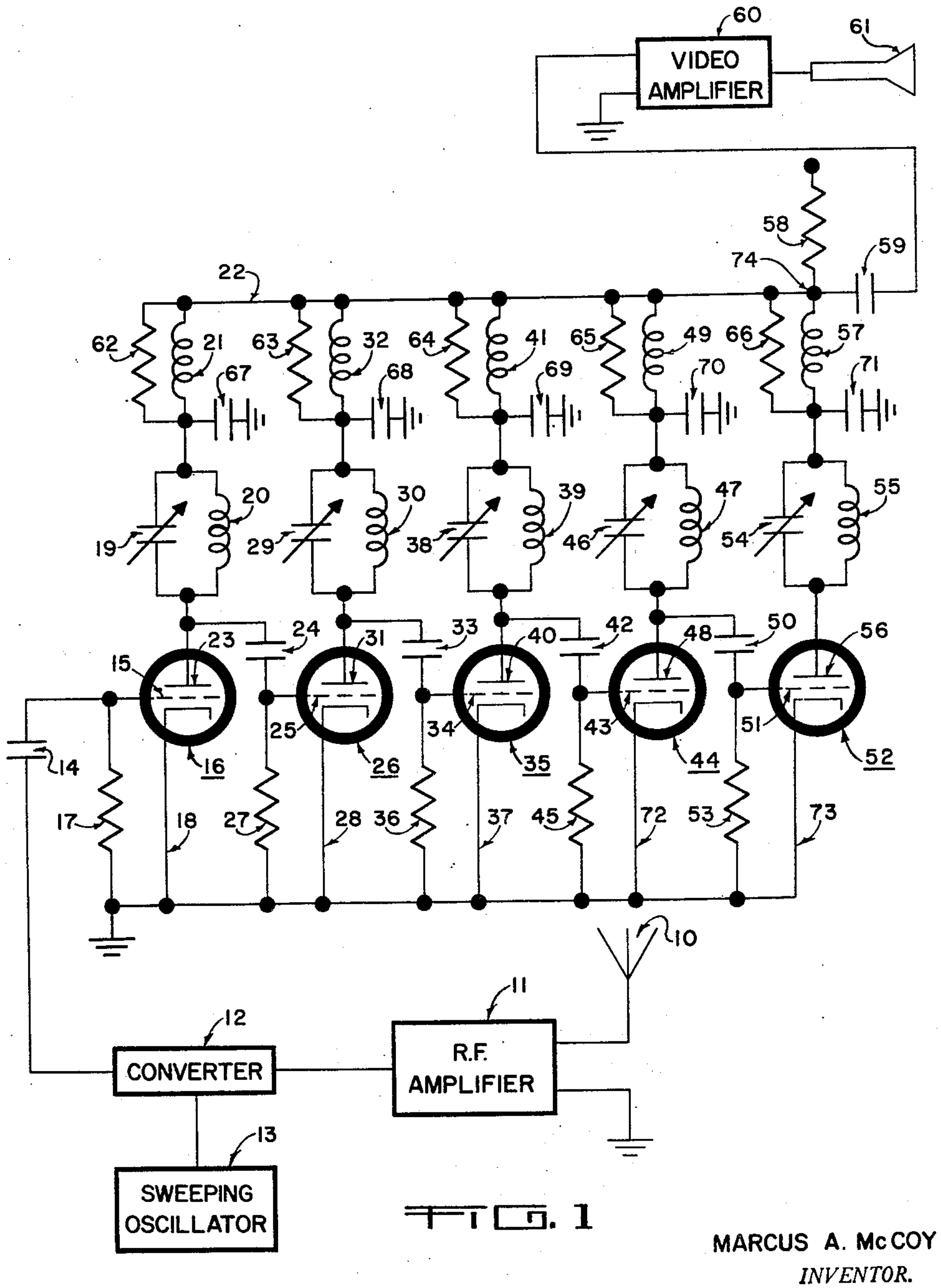
Figure 2A:
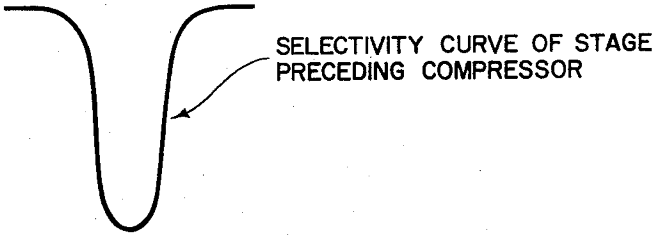
Figure 2B:
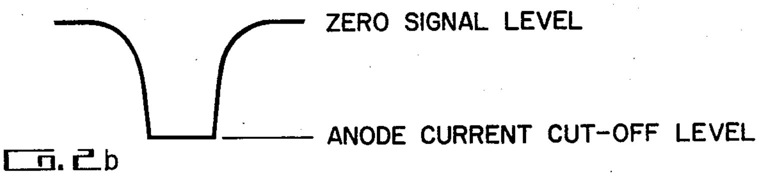
Figure 2C:
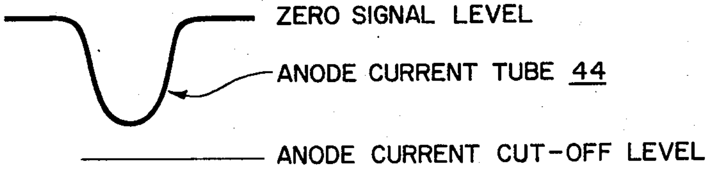
Figure 2D:
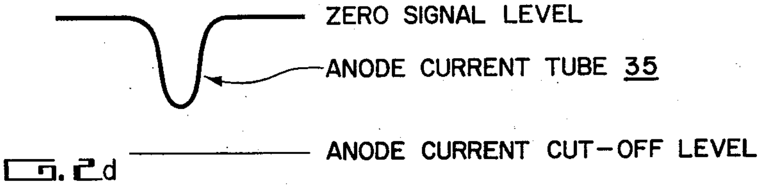
Figure 2E:
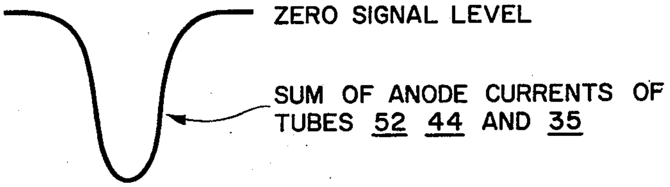
Figure 2F:
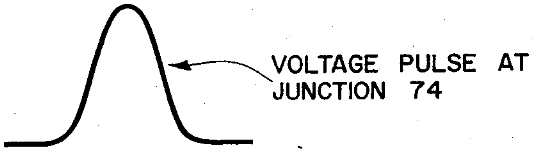

The features of the present invention which are believed to be novel are set forth with particularity in the appended claims. The present invention itself, both as to its organization and manner of operation, together with further objects and advantages thereof, may best be understood by reference to the following description, taken in connection with the accompanying drawings in which:

Figure 1 is a diagram partially in block form and partially in schematic form, of a panoramic receiver incorporating my invention.

Figures 2*a* to 2*f* are diagrams of wave forms at various points in the circuit of Figure 1.

In Figure 1, radio frequency signals are picked up by antenna 10 and amplified in radio frequency amplifier 11 before being impressed upon converter 12. The receiver is swept over the desired range of frequencies by sweeping oscillator 13 which has its output signal injected into converter 12, in conventional fashion. Output from converter 12 is taken at intermediate frequency through coupling condenser 14 to grid 15 of first compressor tube or translating device 16, which may be of the triode variety. Grid 15 is connected to ground through grid leak 17. Cathode 18 is directly grounded. Condenser 19 and inductance 20 are adjusted to resonate at the desired intermediate frequency. Radio frequency choke 21 and by-pass condenser 67 are provided to keep intermediate frequency currents off video bus 22. Shunt resistor 62 may be desirable to damp choke 67. Output signals from anode 23 are taken through condenser 24 to grid 25 of second compressor tube 26. Grid leak 27 is connected between grid 25 and ground or reference potential. Cathode 28 is directly grounded. One junction of condenser 29 and inductance 30 is connected to anode 31 of vacuum tube 26 and the other junction of that condenser and inductance is connected through radio frequency choke 32 to video bus 22. By-pass condenser 68 shunts intermediate frequency currents to ground. Resistor 63 may be provided to damp choke 32. Output signals from second compressor tube 26 are taken through condenser 33 to grid 34 of vacuum tube 35, which is in the third stage of compression in this circuit. Grid 34 is connected to ground through grid lead 36, while cathode 37 is directly grounded. The circuit comprising condenser 38 and inductance 39 is coupled between anode 40 of vacuum tube 35 and one end of radio frequency choke 41 the other end of which is connected to the video bus 22. Condenser 69 is provided to ground intermediate frequency currents. Resistor 64 may be provided to damp choke 41. Output from vacuum tube 35 is taken from anode 40 through condenser 42 to grid 43 of vacuum tube 44 in the fourth stage of compression in this circuit. Grid lead 45 is connected between grid 43 and ground or reference potential. Cathode 72 is grounded. A tuned circuit comprising condenser 46 and inductance 47 is adjusted to the desired intermediate frequency and connected between anode 48 of vacuum tube 44 and one end of radio frequency choke 49, the other end of which is connected to video bus 22. Condenser 70 by-passes intermediate frequency signals to ground. Resistor 65 may be provided to damp choke 49; correspondingly, output signals from anode 48 of vacuum tube 44 are coupled through condenser 50 to the grid 51 of vacuum tube 52 in the fifth stage of compression in this circuit. The grid 51 is connected to ground or reference potential through grid lead 53. Cathode 73 is grounded. A circuit tuned to the intermediate frequency and comprising condenser 54 and inductance 55 is connected between anode 56 of vacuum tube 52 and one end of radio frequency choke 57, the other end of which is connected to the video bus 22. By-pass condenser 71 grounds intermediate frequency signals. Resistor 66 may be provided to damp choke 62. Video bus 22 is connected through the common load resistance 58 to a source of positive potential. Video output signals are taken through condenser 59 to a video amplifier 60 which supplies its output to reproducer 61, which may be a conventional cathode ray tube. If it is a cathode ray tube the appropriate sweeping signals are also provided.

The operation of the circuit is as follows. Signals received on antenna 10 are amplified in a conventional fashion in radio frequency amplifier 11 and coupled to converter 12 into which a variable frequency oscillator 13 is also coupled. As a result of the sweeping action of oscillator 13, the receiver becomes sensitive in sequence to the series of signals lying in the predetermined swept frequency range of the receiver, as is common practice in the art. These signals may, of course, be of widely varying amplitude and if impressed without compression upon a reproducing device, such as a cathode ray tube, the signals of larger amplitude might well suffer from distortion due to saturation in the amplifier stages or in the cathode ray tube itself. Therefore, these signals are passed through condenser 14 into the first of a series of compressor tubes which, for low level signals, act as linear amplifiers of very high gain. The values of the components in the grid bias networks are chosen and the gain of the stages is set so that when any signal rises above a predetermined amplitude, grid current begins to flow on a portion of the positive half-cycles of the signals applied to the final compressor tube 52 and a grid bias develops across resistor 53. As the signal continues to increase, the bias increases on tube 52, approaching cut-off. Simultaneously, the current decreases through tube 52, thus lessening the current through the common load resistor 58. This causes a decrease in the voltage drop across resistor 58 and consequently, a rise in voltage at point 74. This component of voltage change follows directly the ratio of the current change in tube 52 to the current drawn by the preceding tubes as long as the signal level is such that it causes only a negligible change in the amount of anode current drawn by the preceding tubes. As the signal increases further, and the bias on vacuum tube 52 reaches the state where cut-off is about to begin the previous stage has reached a condition of operation where grid current is beginning to flow in portions of the cycle and grid bias is beginning to be developed in that stage. The production of grid bias in the preceding stage causes a reduction of the drive voltage appearing at grid 51 of vacuum tube 52, so that tube does not pass into the cutoff region and the fidelity of the wave form of the impressed signal is, to a large extent, retained. The gain and operating conditions of the tubes are adjusted so that the same phenomenon occurs in successively preceding stages. Furthermore, looking at the circuit from the video output standpoint, as vacuum tube 44 begins to draw grid current and develop grid bias, hence reducing the drive on grid 51 of vacuum tube 52, the video detected by vacuum tube 52 is reduced in amplitude but the video produced by vacuum tube 44 is increasing, as a result of its detector action. This phenomenon progressively moves from stage to stage from the last stage 52 to the first stage including vacuum tube 16. Figure 2 illustrates the effects of grid rectification in the compressor circuit of Figure 1. As the final compressor stage incorporating vacuum tube 52 approaches cut-off, a continued increase in signal strength along curve 2–*a*, which represents the selectivity of the receiver stages preceding the compressor, would result in a clipping action and the anode current wave in tube 52 would have the shape of the solid line curve of Figure 2–*b*. However, before the tube 52 reaches cut-off, grid 43 of tube 44 begins to conduct and grid bias appears, with an attendant reduction in the gain of tube 44 and the drive to tube 52, as indicated earlier in this discussion. With the proper choice of gain per stage and the proper choice of values for the grid biasing networks, the gain of a preceding stage falls faster than the signal magnitude increases, thus more nearly assuring the proper anode current wave shape, as represented by the dotted line in Figure 2–*b*.

The relatively lower levels of anode currents in tubes 44 and 35 are shown in Figures 2–*c* and 2–*d*, and the summation of those currents is shown in Figure 2–*e*. The resulting voltage wave at junction 74 is shown in Figure 2–*f*.

This resultant rising voltage wave partially offsets the loss in tube gain arising with grid-bias generation and further increases the range of such generation before cut-off occurs. These effects are degenerative to the original causes and such degeneration contributes to increased stability and fidelity of reproduction.

Additional stages of compression may be provided if it is felt desirable under certain operating conditions. For the five stage compression circuit described herein, the values of the components for the circuit may be, purely by way of example, as follows:

| | |
|---|---|
| Grid leads 17, 27, 36, 45 and 53 | 100,000 ohms. |
| Condensers 14, 24, 33, 42 and 50 | 50 micromicrofarads. |
| Vacuum tubes 16, 26, 35, 44 and 52 | 12AU7. |
| Plate load resistor 58 | 22,000 ohms. |
| Positive B voltage | 150 volts. |
| Shunting resistances 63 through 66 | 3,000 ohms. |
| Radio frequency chokes 21, 32, 41, 49 and 57 | 50 millihenries. |
| Inductances 20, 30, 39, 47 and 55 | 50 millihenries. |
| Tuning condensers 19, 29, 38, 46 and 54 | 150 micromicrofarads maximum. |
| Bypass condenser 67, 68, 69, 70 and 71 | 1,000 micromicrofarads. |
| I. F. operating frequency | 60 kilocycles. |

While this discussion has related the circuit to panoramic receivers, it also has application to amplitude modulated wave receivers, for this circuit compresses while following with accuracy the shape of the modulated wave.

It may be seen from the foregoing description that there has been provided an improved compression circuit for a panoramic or other type of receiver in which the wave forms of signals differing widely in amplitude are reproduced with fidelity.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A compressor-detector circuit including, in combination a plurality of cascaded, translating device provided, grid-leak detector means each for progressively reducing the gain of a respective succeeding one of said means for increases in input signal strength to preclude the occurrence of current saturation of the said succeeding ones of said means for excessive signal strengths, each of said grid-leak detector means having an input circuit and also an output circuit coupled, except for the last means, to the said input circuit of a respective succeeding one of said means; and a common output load impedance coupled to said output circuits of said means for presenting a common current path therefor.

2. In a panoramic receiver, the compressor-detector circuit as defined in claim 1, and in combination therewith, a video bus common to all of said detector means, each of said output circuits of said means including a carrier signal tank circuit and a carrier signal filter circuit connected, in that order, between a respective means translating device and said bus.

3. In a panoramic receiver, the compressor-detector circuit as defined in claim 1 and in combination therewith, a video bus common to all of said detector means, each of said output circuits of said means including a carrier signal tank circuit and a carrier signal filter circuit connected, in that order, between a respective means translating device and said bus; and said common output load impedance comprising a resistor having one end connected to said bus and the other end adapted for connection to a source of anode operating potential.

References Cited in the file of this patent

UNITED STATES PATENTS

| | | |
|---|---|---|
| 2,014,509 | Roosenstein et al. | Sept. 17, 1935 |
| 2,496,551 | Lawson et al. | Feb. 7, 1950 |
| 2,507,525 | Hurvitz | May 16, 1950 |
| 2,543,068 | Seddon | Feb. 27, 1951 |
| 2,577,506 | Belleville | Dec. 4, 1951 |

FOREIGN PATENTS

| | | |
|---|---|---|
| 361,958 | Great Britain | Nov. 26, 1931 |